(12) United States Patent
Inoue (10) Patent No.: US 11,129,121 B2
(45) Date of Patent: Sep. 21, 2021

(54) INFORMATION DELIVERY SYSTEM, NETWORK SERVER AND METHOD OF CONTROLLING NETWORK SERVER

(71) Applicant: Seiko Epson Corporation, Tokyo (JP)

(72) Inventor: Katsutoyo Inoue, Azumino (JP)

(73) Assignee: Seiko Epson Corporation

( * ) Notice: Subject to any disclaimer, the term of this patent is extended or adjusted under 35 U.S.C. 154(b) by 1 day.

(21) Appl. No.: 16/829,131

(22) Filed: Mar. 25, 2020

(65) Prior Publication Data
US 2020/0314783 A1    Oct. 1, 2020

(30) Foreign Application Priority Data
Mar. 26, 2019  (JP) .............................. JP2019-057890

(51) Int. Cl.
*H04W 56/00*  (2009.01)

(52) U.S. Cl.
CPC ... *H04W 56/0015* (2013.01); *H04W 56/0065* (2013.01)

(58) Field of Classification Search
CPC ......... H04W 56/0015; H04W 56/0065; H04W 56/001; H04W 56/004; H04W 56/005; H04W 56/0055; Y02D 30/70
USPC ....................................................... 370/336
See application file for complete search history.

(56) References Cited

U.S. PATENT DOCUMENTS 9,912,693 B1 * 3/2018 Balmakhtar ........ H04L 63/1441
10,462,034 B2 * 10/2019 Nageshappa ........... H04L 67/10
2004/0003123 A1 * 1/2004 Kwon .................... H04L 29/06
                                                        709/248
2005/0177591 A1 * 8/2005 Kanda ................ H04L 67/1095
2006/0125685 A1 * 6/2006 Jeon ........................ G01S 19/05
                                                        342/357.62
2008/0101282 A1 * 5/2008 Ogura ................. H04W 72/005
                                                        370/328
2008/0106342 A1 * 5/2008 Okamoto .................. G06F 1/08
                                                        331/18
2014/0359075 A1 * 12/2014 Amidei .............. H04N 21/4305
                                                        709/219
2017/0338970 A1 * 11/2017 Savenok ................ H04L 65/403
2018/0017946 A1    1/2018 Kyou et al.
2018/0123930 A1 *  5/2018 Zhang ..................... H04L 43/10
2018/0316620 A1 * 11/2018 Llorca ..................... H04L 67/10
2019/0028347 A1 *  1/2019 Johnston ................. H04L 43/08
2019/0028988 A1 *  1/2019 Yao ..................... H04L 63/0428
2019/0045473 A1 *  2/2019 Balboni ............ H04W 56/0035

(Continued)

FOREIGN PATENT DOCUMENTS

JP    2000-347766 A    12/2000
JP    2018-009882 A     1/2018

*Primary Examiner* — Robert J Lopata
(74) *Attorney, Agent, or Firm* — Harness, Dickey & Pierce, P.L.C.

(57) ABSTRACT

In an information delivery system, the terminal transmits a first request requesting time information to a network server, the network server transmits a second request requesting time information to a time server connected to a network in response to the first request, the network server receives first time information as a response to the second request from the time server, and after a lapse of a predetermined time from reception of the first request, the network server transmits second time information measured based on the first time information to the terminal.

15 Claims, 7 Drawing Sheets

(56) References Cited

U.S. PATENT DOCUMENTS

| | | | |
|---|---|---|---|
| 2019/0081871 A1* | 3/2019 | Nazar | H04L 43/0823 |
| 2019/0303203 A1* | 10/2019 | Guan | G06F 9/5005 |
| 2019/0342187 A1* | 11/2019 | Zavesky | H04L 41/5009 |
| 2020/0015254 A1* | 1/2020 | Nakajima | H04W 72/1263 |
| 2020/0028787 A1* | 1/2020 | Mehra | H04L 47/125 |
| 2020/0044760 A1* | 2/2020 | Seed | H04W 4/70 |
| 2020/0145299 A1* | 5/2020 | Do | H04L 41/082 |
| 2020/0359359 A1* | 11/2020 | Sethi | H04L 41/08 |
| 2020/0374139 A1* | 11/2020 | Ying | H04W 12/122 |
| 2020/0389340 A1* | 12/2020 | Sun | H04L 41/0226 |
| 2020/0396139 A1* | 12/2020 | Shin | H04L 41/5054 |
| 2021/0006386 A1* | 1/2021 | Qi | H04L 7/0041 |
| 2021/0037400 A1* | 2/2021 | Yao | H04W 24/08 |
| 2021/0067912 A1* | 3/2021 | Leem | G06F 1/3206 |
| 2021/0127342 A1* | 4/2021 | Khalid | H04W 56/001 |

* cited by examiner

INFORMATION DELIVERY SYSTEM, NETWORK SERVER AND METHOD OF CONTROLLING NETWORK SERVER

The present application is based on, and claims priority from JP Application Serial Number 2019-057890, filed Mar. 26, 2019, the disclosure of which is hereby incorporated by reference herein in its entirety.

BACKGROUND

1. Technical Field

The present disclosure relates to an information delivery system, a network server and a method of controlling a network server.

2. Related Art

JP-A-2018-9882 discloses a communication device configured to communicate with another device by Bluetooth (Registered trademark), wherein the communication device transmits a notification signal when time of a timepiece unit reaches a first time and modifies the time of the timepiece unit to a second time when a connection request is received from another device.

However, the technique described in JP-A-2018-9882 uses a Bluetooth standard that requires processing to pair or to periodically confirm the presence of the other party, thus, it is difficult to further reduce power consumption.

SUMMARY

A first aspect is an information delivery system including a terminal, and a network server configured to communicate with the terminal via a network, wherein the terminal transmits a first request requesting time information to the network server, the network server transmits a second request requesting time information to a time server connected to the network in response to the first request, the network server receives first time information as a response to the second request from the time server, and after a lapse of a predetermined time from reception of the first request, the network server transmits second time information measured based on the first time information to the terminal.

In a second aspect, in the information delivery system according to the first aspect, the network server transmits, to the terminal, the second time information to which a transmission delay time in a transmission path to the terminal is added.

In a third aspect, in the information delivery system according to the first or second aspect, the terminal measures an internal time, and modifies the internal time based on time information acquired by adding, to the second time information, an internal delay time from reception to confirmation of the second time information.

In a fourth aspect, in the information delivery system according to any one of the first to third aspects, the network server periodically transmits a third request requesting time information to the time server.

In a fifth aspect, in the information delivery system according to any one of the first to fourth aspects, the network server uses, as the first time information, time information acquired from a satellite signal transmitted from a navigation satellite or a standard radio wave transmitted from a standard radio wave transmission station.

In a sixth aspect, in the information delivery system according to any one of the first to fifth aspects, the network server acquires, from another server, at least one type of information, among three types of information including time difference information, daylight saving time information and leap second time information and transmits the information to the terminal along with the second time information.

A seventh aspect is a network server including a network interface configured to communicate with a terminal via a network, and a control device configured to control the network interface, wherein the control device causes the network interface to receive a first request requesting time information from the terminal, transmit a second request requesting time information to a time server connected to the network in response to the first request, receive, from the time server, first time information as a response to the second request, and after a lapse of a predetermined time from reception of the first request, transmit second time information measured based on the first time information to the terminal.

An eighth aspect is a method of controlling a network server that is configured to communicate with a terminal via a network, the method includes receiving a first request requesting time information, transmitting a second request requesting time information to a time server connected to the network in response to the first request, receiving first time information as a response to the second request from the time server, and after a lapse of a predetermined time from reception of the first request, transmitting second time information measured based on the first time information to the terminal.

DESCRIPTION OF EXEMPLARY EMBODIMENTS

Exemplary embodiments of the present disclosure will be described below with reference to the accompanying drawings. In the drawings, the same or similar elements are denoted by the same or similar reference numerals, respectively, and duplicate descriptions are omitted. The embodiments do not limit the contents of the present disclosure described in the claims. All of the configurations described in the embodiments are not necessarily essential constituent requirements of the present disclosure. The technical concept of the present disclosure can variously modify within the technical scope described in the claims.

Information Delivery System

Figure 1:
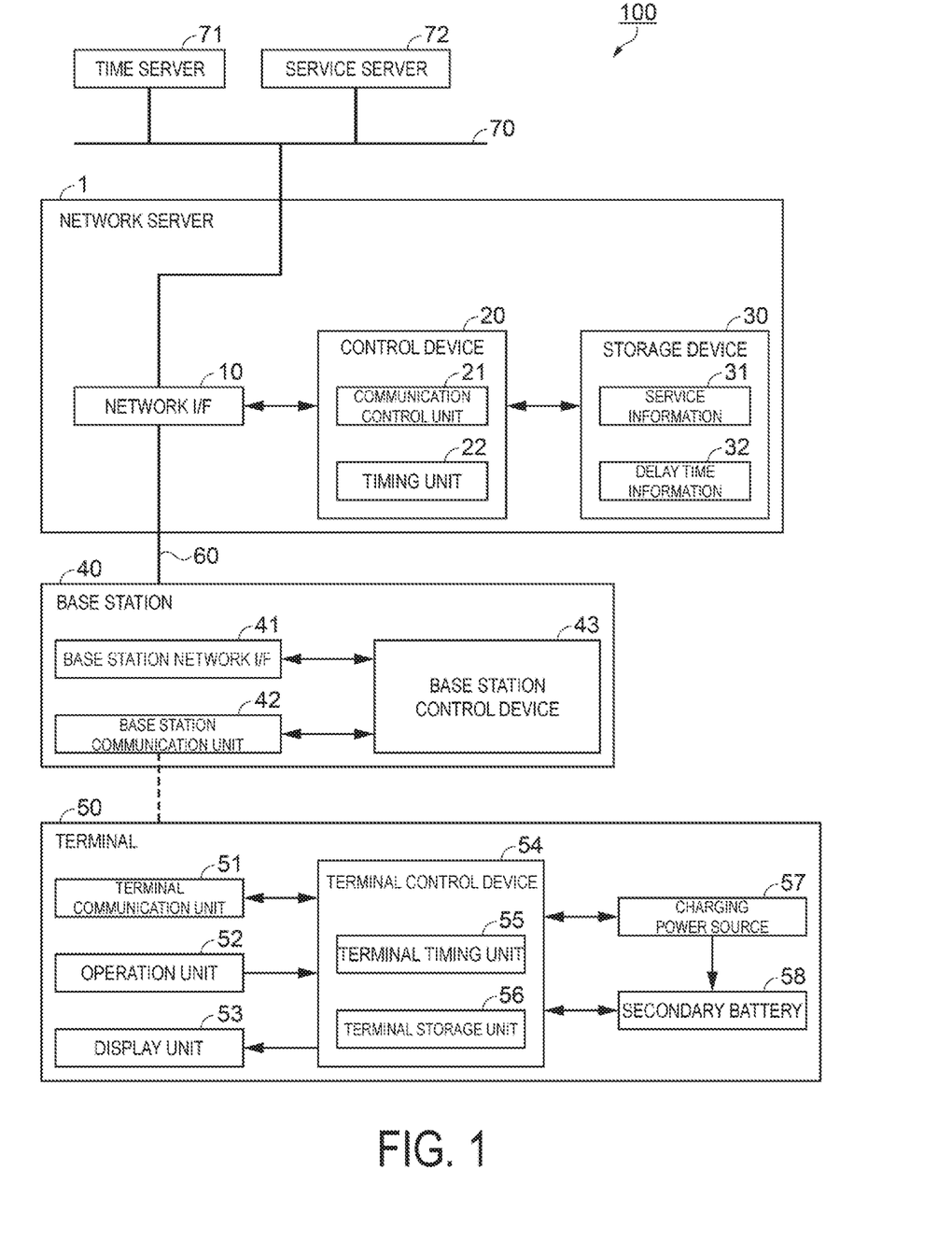
FIG. 1 is a block diagram illustrating a configuration of an information delivery system according to an embodiment.

As illustrated in FIG. 1, an information delivery system 100 according to an embodiment includes a terminal 50, a network server 1 that communicates with the terminal 50 via a network 60, and a base station 40 that relays communication between the terminal 50 and the network server 1. The terminal 50 is, for example, a wristwatch mounted on a user's arm. The terminal 50 transmits a request for information such as time information to the network server 1 via the base station 40. In response to the request from the terminal 50, the network server 1 transmits information to the terminal 50 via the base station 40. The communication link between the terminal 50 and the base station 40 is wireless. The communication links between the base station 40 and the network server 1 may be wired, wireless, or a combination of wired and wireless.

Any one of communication standard groups called Low Power Wide Area (LPWA) may be employed as a communication standard in the information delivery system 100. That is, any of LoRaWAN, SIGFOX, Wi-Fi HaLow, ELTRES, ZETA, and the like can be employed as the communication standard of the information delivery system 100. In this case, the frequency band used for wireless communication between the terminal 50 and the base station 40 is within a sub-gigahertz frequency band range of, for example, about 800 MHz to 950 MHz. By using the sub-gigahertz frequency band, the transmittable distance tends to be longer than the case of using the communication standards in other frequency bands. The communication standard is not limited to the above, and other various communication standards such as NB-IoT may be employed. That is, the frequency band used for wireless communication between the terminal 50 and the base station 40 is not limited to the sub-gigahertz frequency band.

The terminal 50 includes, for example, a terminal communication unit 51, an operation unit 52, a display unit 53, a terminal control device 54, a charging power source 57, and a secondary battery 58. The terminal communication unit 51 is a transceiver that communicates wirelessly with the base station 40. The terminal communication unit 51 is a communication interface (I/F) including an antenna that transmits and receives radio waves, a communication circuit that processes signals of the radio waves transmitted and received by the antenna, and the like. For example, the terminal communication unit 51 demodulates and decodes the signal received from the base station 40, outputs the demodulated and decoded signal to the terminal control device 54, encodes and modulates the signal input from the terminal control device 54, and transmits the encoded and modulated signal to the base station 40. The terminal communication unit 51 communicates wirelessly with the base station 40 under the control by the terminal control device 54.

The operation unit 52 is an operated member that receives a user operation and input a signal corresponding to the user operation to the terminal control device 54. When the terminal 50 is a wristwatch, the operation unit 52 includes, for example, a crown, a button, and the like. For example, the operation unit 52 causes the terminal control device 54 to transmit a request requesting time information addressed to the network server 1 according to a user operation.

The display unit 53 displays information such as time under the control by the terminal control device 54. When the display unit 53 includes an analog timepiece, the display unit 53 includes, for example, an actuator such as a stepper motor, a train wheel, a hand, a dial, and the like. When the display unit 53 includes a digital timepiece, the display unit 53 includes, for example, a display such as a liquid crystal display or an organic electroluminescence display, a drive circuit configured to drive the display device, and the like. The display unit 53 may have any configuration as long as it is a device configured to present a variety of information to the user by an image, a character, a sound, and the like under the control of the terminal control device 54.

The terminal control device 54 includes a terminal timing unit 55 and a terminal storage unit 56. The terminal control device 54 includes, for example, a logical operation circuit such as a central processing unit (CPU) or a microcontroller, a circuit component, and a storage device such as a semiconductor memory The terminal control device 54 configures a computer system that processes calculations necessary for operations of the terminal 50. The terminal control device 54 implements each function described in the embodiment by executing a program stored in the storage device. The terminal control device 54 controls operations of the terminal communication unit 51, the display unit 53, the charging power source 57, and the like. The terminal control device 54 may be composed of integrated hardware, or may be composed of a plurality of separate hardware.

For example, the terminal timing unit 55 divides an oscillation signal generated by a relatively low-power 32768 Hz crystal oscillator, and generates a reference signal of, for example, 1 Hz. The terminal timing unit 55 measures an internal time based on the reference signal. The terminal timing unit 55 is composed of, for example, an integrated circuit (IC). The terminal timing unit 55 includes, for example, a first counter configured to measure Universal Time Coordinated (UTC), which is a universal standard time, a time difference memory that is a non-volatile storage configured to store a time difference with respect to UTC, and a second counter configured to measure a local standard time having the time difference stored in the time difference memory. The terminal timing unit 55 respectively measures the universal standard time of the first counter and the local standard time of the second counter as the internal time.

The terminal storage unit 56 is a storage device such as a semiconductor memory. For example, the terminal memory unit 56 is a computer-readable storage medium configured to store a series of processing programs and various data necessary for operation of the terminal control device 54. The terminal storage unit 56 is not limited to a non-volatile auxiliary storage device, and may be a main storage device such as a register or a cache memory included in the CPU. The terminal storage unit 56 may be composed of integral hardware, or may be composed of a plurality of separate hardware.

The charging power source 57 charges the secondary battery 58 by supplying power to the secondary battery 58. The charging power source 57 includes, for example, a solar panel. The charging power source 57 may be a generator that supplies power to the secondary battery 58 by converting the movement of the terminal 50 into current according to electromagnetic induction. The secondary battery 58 is a storage battery such as a rechargeable button battery. The secondary battery 58 supplies power to each circuit in the terminal 50, and drives each circuit. The terminal 50 can acquire time information with low power consumption, thus, when the terminal 50 includes the charging power source 57 and the secondary battery 58, and the like, periodic maintenance such as external power supply or battery exchange can be omitted.

The base station 40 includes a base station network I/F 41, a base station communication unit 42, and a base station control device 43. The base station 40 is a gateway device that relays communication between the terminal 50 and the network server 1. The base station 40 communicates with the terminal 50 and the network server 1 under a protocol according to the communication standard of the information delivery system 100.

The base station network I/F 41 communicates with the network server 1 via a network 60, which is a communication line such as a public line, under the control of the base station control device 43. The base station communication unit 42 is a transceiver that wirelessly communicates with the terminal 50 under the control of the base station control device 43. The base station control device 43 controls the operations of the base station network I/F 41 and the base station communication unit 42. The base station control device 43 includes a processing circuit such as a CPU.

Figure 2:
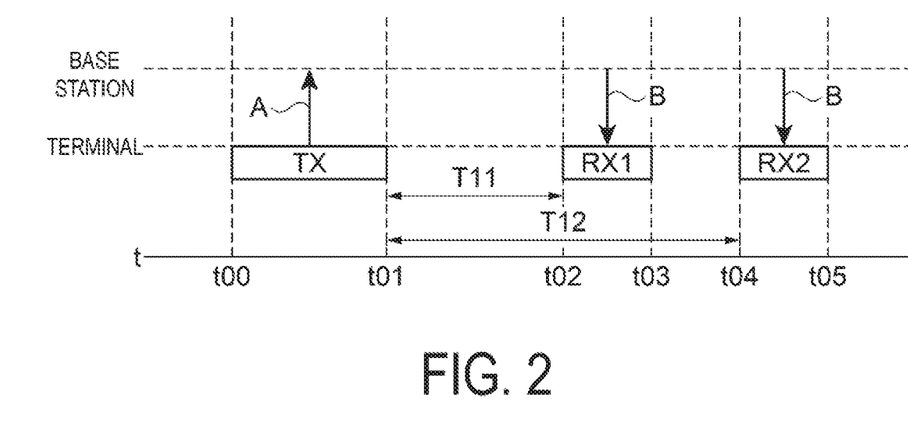
FIG. 2 is a sequence diagram illustrating signal transmission and reception between a terminal and a base station.

As illustrated in FIG. 2, for example, in class A of the LoRaWAN, the terminal 50 transmits a signal A to the base station 40 at a transmission time TX from a time t00 to a time t01. Although not illustrated in FIG. 2, the base station 40 converts the signal A into an Internet Protocol (IP) packet by encapsulating the signal A, and transmits it to the network server 1. The network server 1 receives the encapsulated signal A, converts it to an IP packet by encapsulating a signal B as an acknowledge signal (ACK) with respect to the signal A, and transmits it to the base station 40.

The base station 40 transmits the signal B to the terminal 50 at a reception time RX1 from a time t02, at which a reception delay time T11 has elapsed from the time t01 when the reception of the signal A is completed, to a time t03. Alternatively, the base station 40 transmits the signal B to the terminal 50 at a reception time RX2 from a time t04, at which a reception delay time T12 has elapsed from the time t01 when the reception of the signal A is completed, to a time t05. The reception delay time T11 is 1 second, and T12 is 2 seconds. The reception measures RX1 and RX2 are times at which the terminal 50 waits for initiation of reception of the signal B, which is a response to the signal A. For example, when the timing of transmitting the signal B to the terminal 50 is not in time for the reception time RX1, the base station 40 transmits the signal B at the reception time RX2.

The network server 1 includes a network I/F 10, a control device 20, and a storage device 30. The network server 1 delivers, to the terminal 50, information provided by a timeserver 71 and other service servers 72 connected to a network 70. The time server 71 is a server that provides time information indicating standard time in response to a request from the network server 1, such as a Network Time Protocol (NTP) server corresponding to leap seconds. The service server 72 is a server that provides services by various applications to the terminal 50. The service server 72 is, for example, a time difference information server, a daylight saving time information server, a base station location information server, a messaging server, a home automation server, or the like.

The time difference information server provides time difference information indicating a time difference with respect to UTC in each time zone. The daylight saving time information server provides daylight saving information indicating whether a Daylight Saving Time (DST) is performed and an offset time in the case of performing the DST. The base station location information server provides base station location information indicating location of the base station 40. The messaging server is a server that delivers a message in response to a predetermined trigger, such as a Message Queuing Telemetry Transport (MQTT) server. The home automation server is a server used for a variety of home automation.

The network I/F 10 communicates with the base station network I/F 41 of the base station 40 via the network 60 under the control of the control device 20. Thereby, the network I/F 10 communicates with the terminal 50 via the network 60 and the base station 40. Further, the network I/F communicates with the time server 71 or the service server 72 via the network 70, such as a public line, under the control of the control device 20.

The control device 20 includes a communication control unit 21 and a timing unit 22. The control device 20 includes, for example, a logic operation circuit such as a CPU or a microcontroller, a circuit component, a semiconductor memory, and the like. The control device 20 configures a computer system that processes calculations necessary for operations of the network server 1. For example, the control device 20 implements each function described in the embodiment, by executing a program stored in the storage device 30. The control device 20 may be composed of integral hardware, or may be composed of a plurality of separate hardware.

The communication control unit 21 controls the network I/F 10 to cause the network I/F 10 to perform communication with the terminal 50 via the base station 40. Further, the communication control unit 21 causes the network I/F 10 to perform communication with the time server 71, the service server 72, and the like. The communication control unit 21 communicates with the base station 40 and the terminal 50 according to a protocol defined in the communication standard in the information delivery system 100. In response to a first request, which requests time information and which is transmitted from the terminal 50, the communication control unit 21 transmits a second request requesting time information to the time server 71. The communication control unit 21 receives first time information as a response to the second request from the time server 71. After a lapse of a predetermined time from reception of the first request, the communication control unit 21 transmits second time information measured based on the first time information to the terminal 50.

The timing unit 22 includes, for example, an oscillator circuit configured to generate an oscillation signal by applying a voltage to a crystal oscillator, a frequency divider circuit configured to divide the oscillation signal to generate a reference signal having a predetermined frequency, and a timing circuit configured to measure a time based on the reference signal. The timing unit 22 is composed of, for example, an integrated circuit (IC). The timing unit 22 measures a management time based on the reference signal. When the communication control unit 21 acquires the first time information from the time server 71, the timing circuit of the timing unit 22 updates the management time to the first time information, and measures the management time as the second time information measured based on the first time information.

The timing unit 22 may include, as an example of an oscillator that is operated by a system power source, a high-accuracy oscillator such as an atomic oscillator, a temperature compensated oscillator, or a thermostatic chamber oscillator. The atomic oscillator generates a reference signal based on the frequency specific to the atom. The temperature compensated oscillator electrically compensates for the frequency variation of the crystal oscillator due to temperature. The thermostatic chamber oscillator suppresses frequency fluctuations by accommodating the crystal oscillator in a thermostatic chamber that keeps the temperature constant by using a heater. By providing a high-accuracy oscillator in the timing unit 22, the accuracy of measuring the management time can be improved.

The storage device 30 stores service information 31 and delay time information 32. The storage device 30 is a computer-readable storage medium such as a semiconductor memory or a disk media. The storage device 30 stores programs and various data indicating a series of processes necessary for operations of the network server 1. The storage device 30 is not limited to a non-volatile auxiliary storage device, and may be a main storage device such as a register or cache memory included in a processing circuit such as a CPU.

The service information 31 includes a variety of information provided from the service server 72. For example, the service information 31 is acquired from the service server 72 in response to the request from the terminal 50, read from the storage device 30 at a predetermined timing, and transmitted to the terminal 50. The service information 31 may be information acquired from the service server 72 in a periodic scan or a push notification before the request from the terminal 50. The service information 31 is, for example, time difference information, daylight saving time information, base station location information, message information, home automation information, and the like.

The delay time information 32 is a transmission delay time D in a transmission path including a public line or the like, from a signal is transmitted to the network server 1 to the signal is received by the terminal 50. The transmission delay time D has different values depending on the location of the base station and the like, thus, the transmission delay time D is determined for each base station by, for example, measuring or the like.

Information Delivery Method

Hereinafter, with reference to a flowchart of FIG. 3, an information delivery method of the information delivery system 100 will be described as an example of the operation of the information delivery system 100. The flowchart of FIG. 3 is described with a method of controlling the network server 1 as a principal axis, and therefore, the operations of the entire information delivery system 100 will be described with reference to a sequence diagram of FIG. 4 as appropriate.

Figure 4:
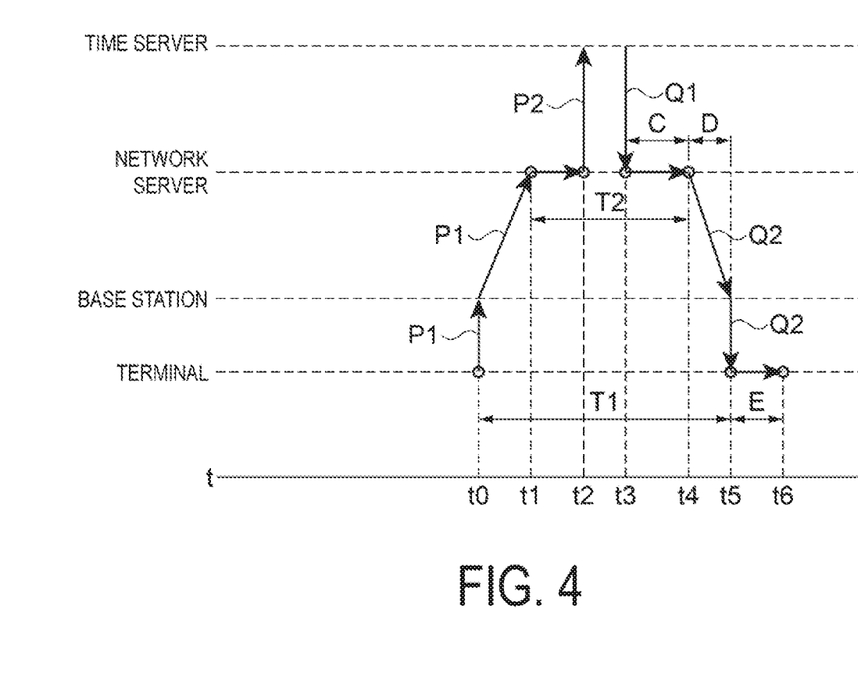
FIG. 4 is a sequence diagram illustrating an example of operations of the information delivery system.

First, at a time t0 in FIG. 4, the terminal 50 addresses a first request P1 to the network server 1, and transmit the first request P1, which is signal requesting time information, to the base station 40. The terminal 50 may transmit the first request P1 in response to the user's operation with respect to the operation unit 52, and the terminal 50 may transmit the first request P1 at a predefined timing, such as 2 am every day. The base station 40 receives the first request P1 transmitted from the terminal 50, converts it into an IP packet by encapsulation, and transfers it to the network server 1. At a time t1, the network server 1 receives the first request P1 transmitted from the terminal 50 and encapsulated in the base station 40.

Figure 3:
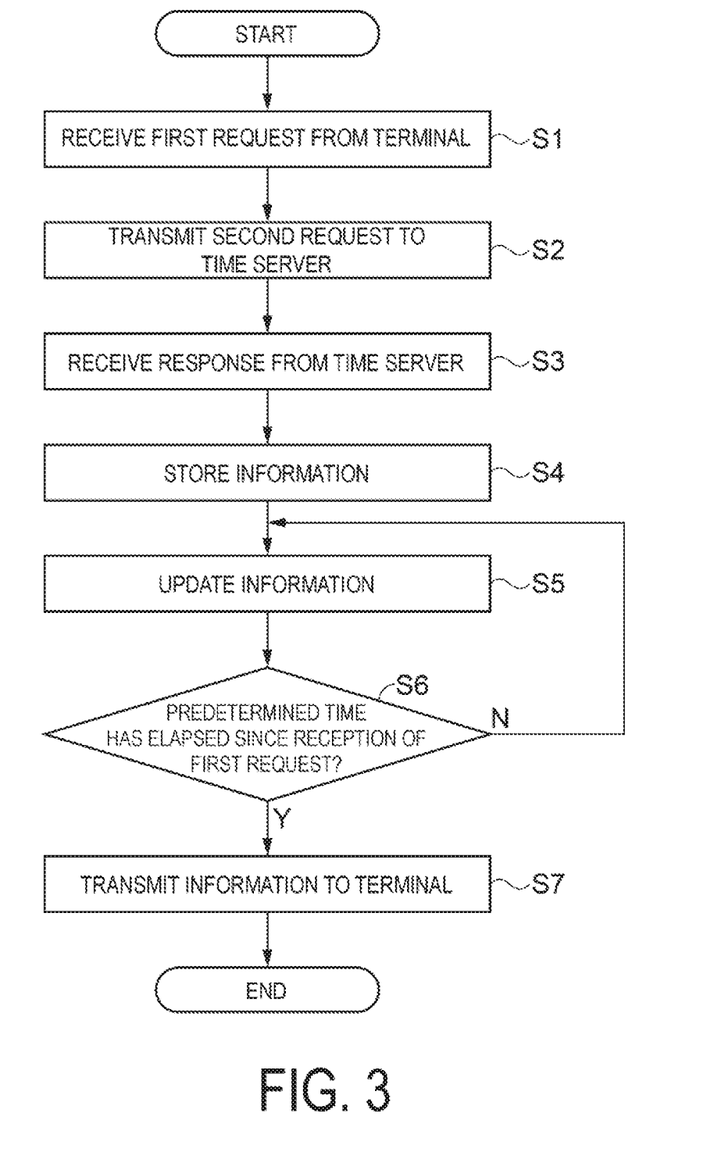
FIG. 3 is a flowchart illustrating an example of an information delivery method.

That is, in step S1 of FIG. 3, the network I/F 10 of the network server 1 receives the IP packet including the first request P1 transmitted from the terminal 50, under the control of the communication control unit 21. In this way, a series of processing of the network server 1 is initiated with the transmission of the first request P1 from the terminal 50 as a trigger.

In step S2, the communication control unit 21 causes the network I/F 10 to transmit a second request P2 requesting time information to the time server 71 in response to the first request P1. That is, at a time t2 in FIG. 4, the network server 1 transmits the second request P2 to the time server 71. The second request P2 is converted to include the same information as the encapsulated first request P1, for example. The second request P2 may be defined by a protocol different from the first request P1.

In step S3, the network I/F 10 receives first time information Q1 as a response to the second request P2 from the time server 71. That is, at a time t3 in FIG. 4, the network server 1 receives the first time information Q1, which is static time information transmitted from the time server 71 as a response to the second request P2. The second request P2 and the first time information Q1 are transmitted and received by NTP, for example.

In step S4, the timing unit 22 acquires the first time information Q1 received by the network I/F 10 in step S3, and stores the first time information Q1 as a starting point of the management time. Next, in step S5, the timing unit 22 updates the time information by measuring the management time based on the first time information Q1. In step S6, the communication control unit 21 determines whether a predetermined time T2 (see FIG. 4) has elapsed since the time t1 at which the first request P1 is received. If the predetermined time T2 has not elapsed, the communication control unit 21 repeats the processing in step S5 until the predetermined time T2 has elapsed. If the predetermined time T2 has elapsed, the communication control unit 21 proceeds to step S7.

When the predetermined time T2 has elapsed since the first request P1 is received, in step S7, the network I/F 10 transmits, to the terminal 50, second time information Q2, which is measured based on the first time information Q1, and to which a transmission delay time D included in the delay time information 32 is added. That is, at a time t4 in FIG. 4, the network server 1 addresses the IP packet including the second time information Q2, which is static time information, to the terminal 50, and transmits the IP packet to the base station 40. The management time at the time t4 is a time acquired by adding a measured time C, which is measured by the timing unit 22 from the time t3 to the time t4, to a time indicated by the first time information Q1. The second time information Q2 is a time, which is acquired by adding the measured time C and the transmission delay time D to the time indicated by the first time information Q1. Note that, the measured time C is a time representing a difference between a time when the network server 1 acquires the first time information Q1 from the time server 71 and a time when the network server 1 transmits the second time information Q2 to the base station 40, and is a time including zero.

At a time t5 in FIG. 4, the terminal 50 receives, from the base station 40, the second time information Q2 transmitted from the network server 1. Although not illustrated in FIG. 4, the time t5 is included in a reception time RX starting from a time, at which a reception delay time T1 has elapsed since the time t0 when the terminal 50 transmitted the first request P1, as in the reception time RX1 or RX2 in FIG. 2. In other words, the network server 1 transmits the second time information Q2 to the terminal 50 such that the second time information Q2 is received by the terminal 50 within the reception time RX. That is, the predetermined time T2 may be determined in consideration of the reception delay time T1, the transmit delay time D, and the like. When the communication standard of the information delivery system 100 is, for example, class A of LoRaWAN, the reception delay time T1 is 1 second or 2 seconds. The terminal timing unit 55 acquires the second time information Q2 from the terminal communication unit 51, and determines the second time information Q2 at a time t6.

At the time of determining the second time information Q2, the terminal timing unit 55 modifies an internal time based on the time information acquired by adding an internal delay time E to the second time information Q2, the internal delay time E is a time from the reception to the confirmation of the second time information Q2, that is, a time from the time t5 to the time t6. The internal delay time E is a delay time for processing in the terminal 50. The time, which is modified as the internal time at the time t6, corresponds to a time acquired by adding the measured time C, the transmission delay time D and the internal delay time E to the time indicated by the first time information Q1.

As described above, according to the information delivery system 100, a procedure to maintain a connection such as a Bluetooth standard is not required, and the time information can be delivered to the terminal at a predetermined timing in response to the request from the terminal 50. Therefore, according to the information delivery system 100, the terminal 50 can acquire information by requesting information at any timing, and power consumption of the terminal 50 for acquiring information can be reduced. Furthermore, when LoRaWAN is employed as the communication standard, the information delivery method according to the present embodiment can be applied without changing the LoRaWAN protocol.

When receiving the first request P1 requesting the time information from the terminal 50, the network server 1 transmits, to the terminal 50, the second time information Q2, which is measured based on the first time information Q1 from the time when the first time information Q1 is received from the time sever 71 to the time when the terminal 50 responds. Therefore, the network server 1 can match the second time information Q2 transmitted to the terminal 50 with a standard time managed by the time server 71, and can improve the accuracy of the second time information Q2. Furthermore, the network server 1 transmits second time information Q2 to which the transmission delay time D in the transmission path from the network server 1 to the base station 40 is added. Therefore, the accuracy of the second time information Q2 can be further improved.

The terminal 50 modifies the internal time of the terminal timing unit 55 based on the time information acquired by adding the internal delay time E to the second time information Q2, the internal delay time E is the time from the time when the second time information Q2 is received from the network server 1 to the confirmation of the second time information Q2. Therefore, the terminal 50 can further improve the accuracy of the internal time with respect to the standard time managed by the time server 71.

First Modified Example

Figure 5:
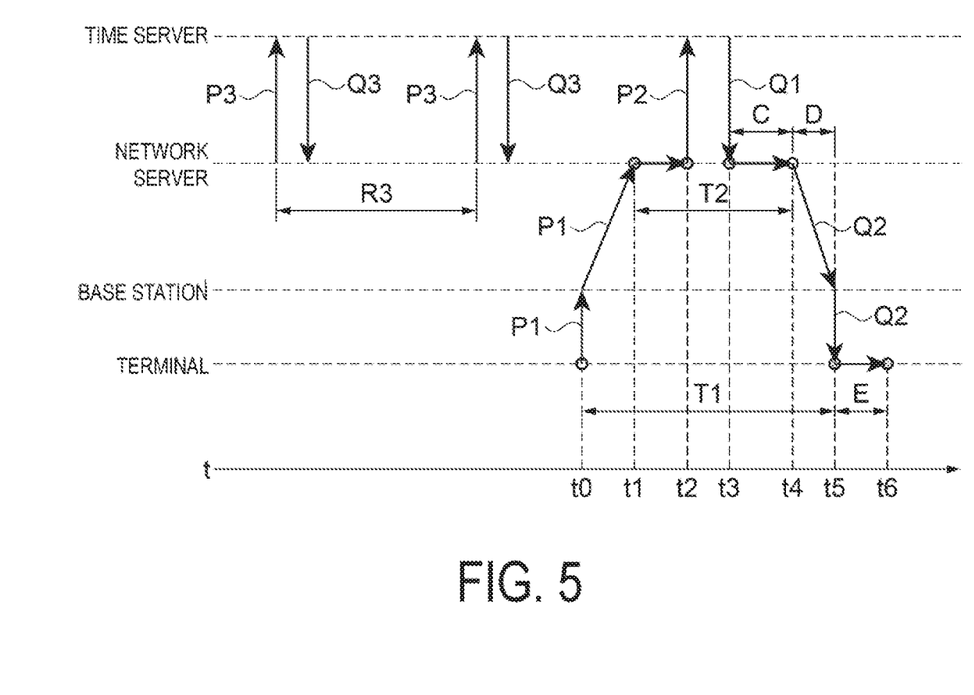
FIG. 5 is a sequence diagram illustrating an example of operations of an information delivery system according to a first modified example of the embodiment.

As illustrated in FIG. 5, the network server 1 may periodically transmit a third request P3 requesting time information to the time server 71. For example, the network server 1 transmits a third request P3 to the time server 71 at a predetermined period R3. The third request P3 has the same content as the second request P2 transmitted in response to the first request P1, for example. In response to the reception of the third request P3, the time server 71 periodically transmits the third time information Q3 indicating the standard time to the network server 1. The network server 1 updates the management time of the timing unit 22 to the third time information Q3 every time when it is received, and continues measuring the management time. That is, the network server 1 can use the third time information Q3 as the first time information Q1.

For example, it is assumed that the network server 1 receives the first request P1 transmitted from the terminal 50 and transmits the second request P2 to the time server 71, but cannot receive the first time information Q1 from the time server 71. Even in this case, the network server 1 periodically transmits the third request P3 to maintain the accuracy of the management time of the timing unit 22 to be constant. Accordingly, at the time t4 when the response to the first request P1 is transmitted, the network server 1 addresses the second time information Q2, which is acquired by adding the transmission delay time D to the management time of the timing unit 22, to the terminal 50, and transmits it to the base station 40. By doing this, time information having high accuracy can be delivered to the terminal 50.

Second Modified Example

Figure 6:
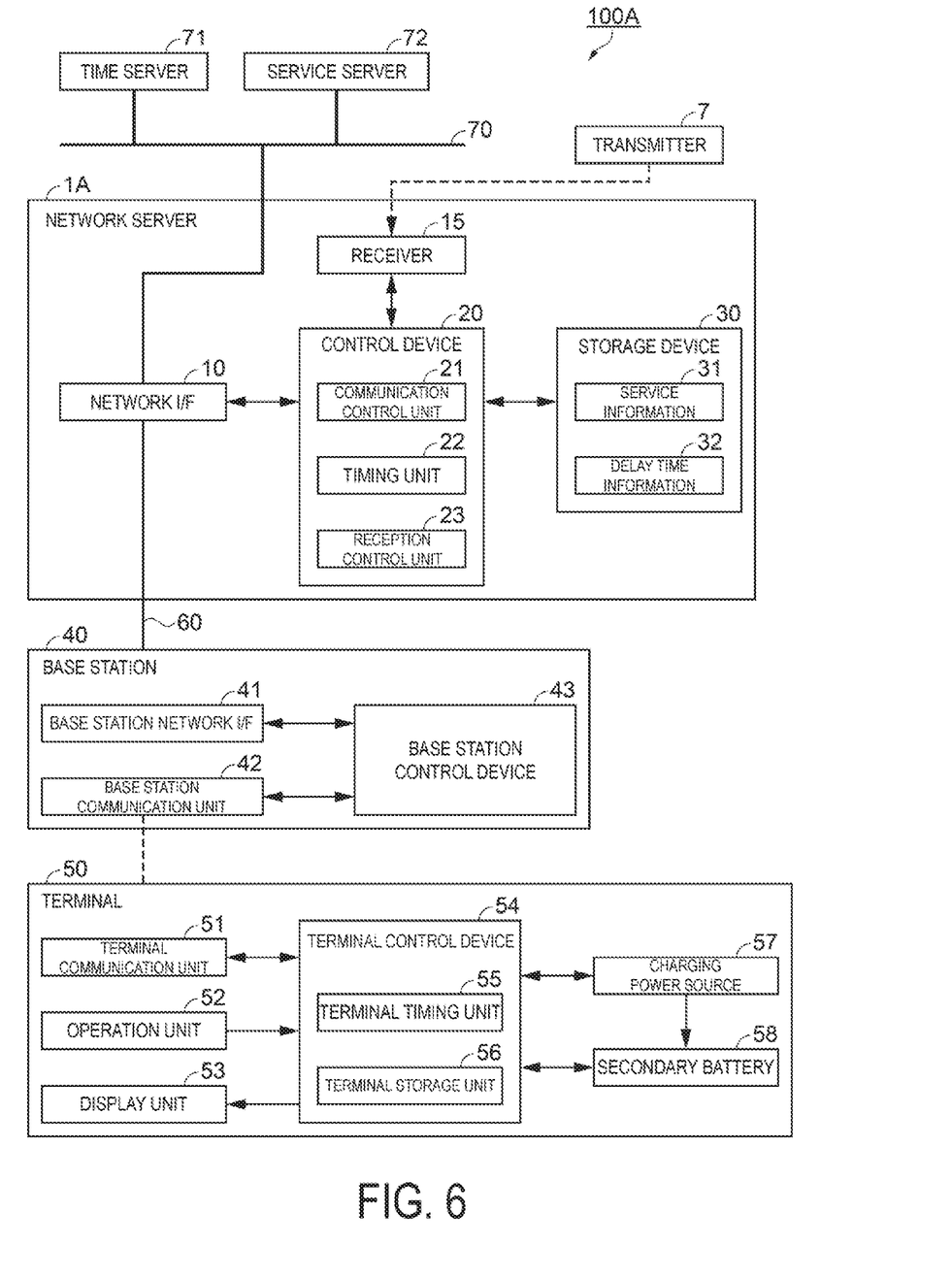
FIG. 6 is a block diagram illustrating a configuration of an information delivery system according to a second modified example of the embodiment.

As illustrated in FIG. 6, an information delivery system 100A according to the second modified example defers from the embodiment described above in that the network server 1A includes a receiver 15 configured to receive a radio wave transmitted from a transmitter 7. Other configurations, operations, and effects of the information delivery system 100A that are not described below are similar to the information delivery system 100 described above, thus redundant descriptions are omitted.

The transmitter 7 is, for example, a navigation satellite such as a Global Positioning System (GPS) satellite, a standard radio wave transmission station that transmits standard radio waves, or the like. Therefore, the receiver 15 is an antenna and a receiving circuit configured to receive a satellite signal transmitted from the navigation satellite or a standard radio wave transmitted from the standard radio wave transmission station. The receiver 15 may include a receiver that receives satellite signals and a receiver that receives standard radio waves. The receiver 15 executes reception processing of satellite signal or standard wave under the control of a reception control unit 23 included in the control device 20.

For example, the reception control unit 23 controls the receiver 15 at a predetermined timing to acquire time information indicating standard time from a satellite signal transmitted from a navigation satellite or a standard radio wave transmitted from a standard radio wave transmission station. The timing unit 22 uses the time information acquired by the reception control unit 23 as the first time information Q1. That is, the timing unit 22 updates the management time every time the reception control unit 23 acquires the time information, and continues measuring the management time. Therefore, at a time when the response to the first request P1 is transmitted, the network server 1A addresses the second time information Q2, which is acquired by adding the transmission delay time D to the management time of the timing unit 22, to the terminal 50, and transmits it to the base station 40. By doing this, time information having high accuracy can be delivered to the terminal 50.

Other Exemplary Embodiments

Although the embodiments are described above, the present disclosure is not limited thereto. The configuration of each part may be replaced with any configuration having the same function, and any configuration in each embodiment may be omitted or added within the technical scope of the present disclosure. Therefore, various alternative embodiments will be apparent to those skilled in the art from these disclosures.

For example, the network server 1 may acquire at least one type of information, among three types of information including time difference information, daylight saving time information, and leap second information, from another service server 72, and transmits the information to the terminal 50 along with the second time information Q2. The leap second information is information indicating the time when the leap second is added or deleted. The leap second information may be acquired from the time server 71 which is an NTP server corresponding to leap seconds.

Figure 7:
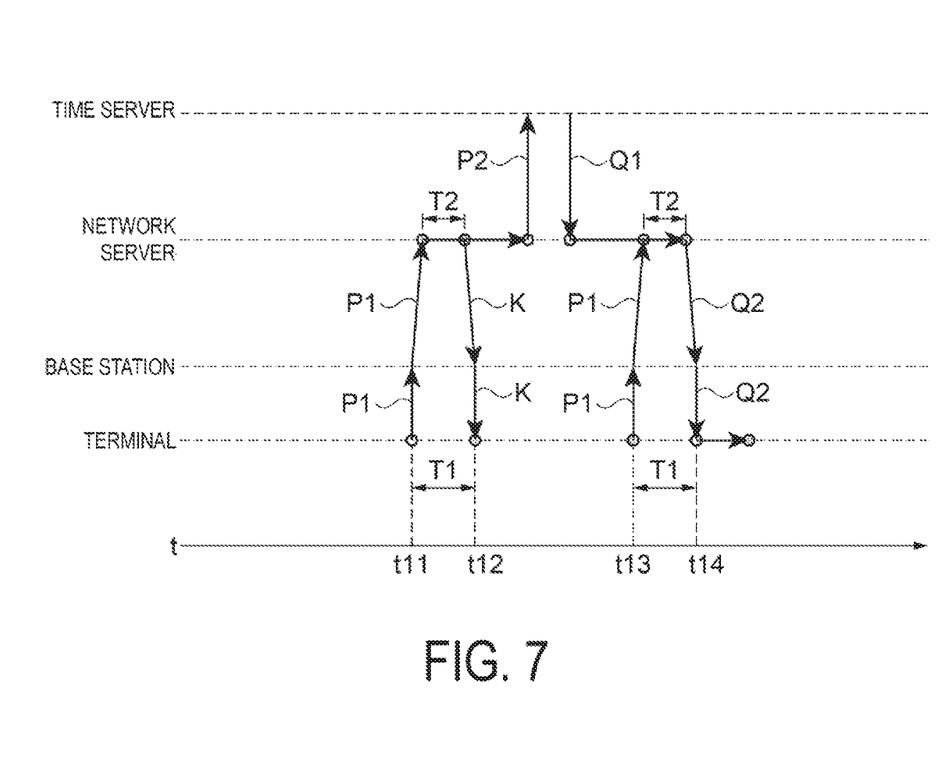
FIG. 7 is a sequence diagram illustrating an example of operations of an information delivery system according to another embodiment.

In addition, as illustrated in FIG. 7, it is assumed that the network server 1 cannot receive the first time information Q1 from the time server 71 until a time when the response to the first request P1, which is transmitted from the terminal at a time t11, is transmitted. In this case, at a time when the predetermined time T2 has elapsed since the reception of the first request P1, a signal K that is an ACK with respect to the first request P1 may be transmitted to the terminal 50. For example, in response to receiving the signal K at a time t12 when the reception delay time T1 has elapsed since the time t11, the terminal 50 waits until a time t13 when the first request P1 is transmitted again.

In response to the first request P1 transmitted at the time t11, the network server 1 transmits the second request P2 to the time server 71, and receives the first time information Q1 from the time server 71. At the time t13 when a predetermined standby time has elapsed since the time t12, the terminal 50 transmits the first request P1 again to the network server 1. When the predetermined time T2 has elapsed since the first request P1 is received, the network server 1 transmits, to the terminal 50, the second time information Q2, which is measured based on the first time information Q1, and to which the transmission delay time D (not illustrated in FIG. 7) is added. The terminal 50 receives the second time information Q2 at a time t14 when the reception delay time T1 has elapsed since the time t13. Thereby, the terminal 50 can acquire time information having high accuracy from the network server 1. Note that, a period from the time when the network server 1 acquires the first request P1 transmitted from the terminal 50 at the time t11, to the time when the network server 1 transmits the second time information Q2 to the terminal 50 corresponds to the predetermined time T2 in the first embodiment. By measuring the elapsed time from the time when the first time information Q1 is received, the network server 1 can transmit the second time information Q2 to the terminal 50 at a predetermined timing in response to the request from the terminal 50 again at the time t13.

In addition, of course, the present disclosure includes various embodiments that are not described above, such as a configuration in which the above-described configurations are mutually applied. The technical scope of the present disclosure is defined only by the invention specifying matters according to the scope of claims reasonable from above description.

The contents derived from the exemplary embodiments described above will be described below as each aspect.

A first aspect is an information delivery system including a terminal, and a network server configured to communicate with the terminal via a network, wherein the terminal transmits a first request requesting time information to the network server, the network server transmits a second request requesting time information to a time server connected to the network in response to the first request, the network server receives first time information as a response to the second request from the time server, and after a lapse of a predetermined time from reception of the first request, the network server transmits second time information measured based on the first time information to the terminal.

According to the first aspect, processing for maintaining the connection between the terminal and the network server is unnecessary, thus the power consumption required to acquire the time information can be reduced.

In a second aspect, in the information delivery system according to the first aspect, the network server transmits, to the terminal, the second time information to which a transmission delay time in a transmission path to the terminal is added.

According to the second aspect, the terminal can acquire the second time information having high accuracy.

In a third aspect, in the information delivery system according to the first or second aspect, the terminal measures an internal time, and modifies the internal time based on time information acquired by adding, to the second time information, an internal delay time from reception to confirmation of the second time information.

According to the third aspect, the terminal can modify the internal time based on the time information having high accuracy.

In a fourth aspect, in the information delivery system according to any one of the first to third aspects, the network server periodically transmits a third request requesting time information to the time server.

According to the fourth aspect, the time information can be transmitted to the terminal even when the network server is unable to acquire time information from the time server within a predetermined time from reception of the first request.

In a fifth aspect, in the information delivery system according to any one of the first to fourth aspects, the network server uses time information acquired from a satellite signal transmitted from a navigation satellite or a standard radio wave transmitted from a standard radio wave transmission station as the first time information.

According to the fifth aspect, the network server can acquire the time information from other than the time server.

In a sixth aspect, in the information delivery system according to any one of the first to fifth aspects, the network server acquires, from another server, at least one type of information, among three types of information including time difference information, daylight saving time information and leap second time information and transmits the information to the terminal along with the second time information.

According to the sixth aspect, the terminal can acquire the time information and information other than the time information that may be changed due to the circumstances of a third party.

A seventh aspect is a network server including a network interface configured to communicate with a terminal via a network, and a control device configured to control the network interface, wherein the control device causes the network interface to receive, from the terminal, a first request requesting time information, transmit a second request requesting time information to a time server connected to the network in response to the first request, receive first time information as a response to the second request from the time server, and after a lapse of a predetermined time from reception of the first request, transmit second time information measured based on the first time information to the terminal.

According to the seventh aspect, processing for maintaining the connection between the terminal and the network server is unnecessary, thus, the power consumption of the terminal required to acquire the time information can be reduced.

An eighth aspect is a method of controlling a network server that is configured to communicate with a terminal via a network, the method includes receiving a first request requesting time information, transmitting a second request requesting time information to a time server connected to the network in response to the first request, receiving first time information serving as a response to the second request from the time server, and after a lapse of a predetermined time from reception of the first request, transmitting second time information measured based on the first time information to the terminal.

According to the eighth aspect, processing for maintaining the connection between the terminal and the network server is unnecessary, thus the power consumption of the terminal required to acquire the time information can be reduced.

What is claimed is:

1. An information delivery system comprising:
   a terminal; and
   a network server configured to communicate with the terminal via a network, wherein
   the terminal transmits a first request requesting time information to the network server,
   the network server transmits, in response to the first request, a second request requesting time information to a time server connected to the network,
   the network server receives, from the time server, first time information as a response to the second request, and
   after a lapse of a predetermined time from reception of the first request, the network server transmits second time information measured based on the first time information to the terminal.

2. The information delivery system according to claim 1, wherein
   the second time information is calculated by adding a transmission delay time among the network server and the terminal to the first time information.

3. The information delivery system according to claim 2, wherein
   the terminal measures an internal time, and modifies the internal time based on time information acquired by adding, to the second time information, an internal delay time from reception of the second time information to confirmation of the second time information.

4. The information delivery system according to claim 3, wherein
   the network server periodically transmits a third request requesting time information to the time server.

5. The information delivery system according to claim 4, wherein
   the network server uses, as the first time information, time information acquired from a satellite signal transmitted from a navigation satellite or a standard radio wave transmitted from a standard radio wave transmission station.

6. The information delivery system according to claim 5, wherein
   the network server acquires, from another server, at least one type of information, among three types of information including time difference information, daylight saving time information and leap second time information and transmits the information to the terminal along with the second time information.

7. A network server comprising:
   a network interface configured to communicate with a terminal via a network; and
   a control device configured to control the network interface, wherein
   the control device causes the network interface to receive a first request requesting time information from the terminal, transmit a second request requesting time information to a time server connected to the network in response to the first request, receive, from the time server, first time information as a response to the second request, and
   after a lapse of a predetermined time from reception of the first request, transmit second time information measured based on the first time information to the terminal.

8. A method of controlling a network server that is configured to communicate with a terminal via a network, the method comprising:
   receiving a first request requesting time information;
   transmitting a second request requesting time information to a time server connected to the network in response to the first request;
   receiving, from the time server, first time information as a response to the second request; and
   after a lapse of a predetermined time from reception of the first request, transmitting second time information measured based on the first time information to the terminal.

9. The method of controlling a network server according to claim 8, wherein
   the second time information is calculated by adding a transmission delay time among the network server and the terminal to the first time information.

10. The method of controlling a network server according to claim 9, wherein
    the terminal measures an internal time, and modifies the internal time based on time information acquired by adding, to the second time information, an internal delay time from reception of the second time information to confirmation of the second time information.

11. The method of controlling a network server according to claim 10, wherein
    the network server periodically transmits a third request requesting time information to the time server.

12. The method of controlling a network server according to claim 10, wherein
    the network server uses, as the first time information, time information acquired from a satellite signal transmitted from a navigation satellite or a standard radio wave transmitted from a standard radio wave transmission station.

13. The method of controlling a network server according to claim 11, wherein
    the network server uses, as the first time information, time information acquired from a satellite signal transmitted from a navigation satellite or a standard radio wave transmitted from a standard radio wave transmission station.

14. The method of controlling a network server according to claim 12, wherein
    the network server acquires, from another server, at least one type of information, among three types of information including time difference information, daylight saving time information and leap second time information and transmits the information to the terminal along with the second time information.

15. The method of controlling a network server according to claim 13, wherein
the network server acquires, from another server, at least one type of information, among three types of information including time difference information, daylight saving time information and leap second time information and transmits the information to the terminal along with the second time information.

\* \* \* \* \*